Oct. 12, 1965  T. J. McSHEA  3,211,334
VARIABLE CHARGE COFFEE DISPENSER
Filed Dec. 23, 1963
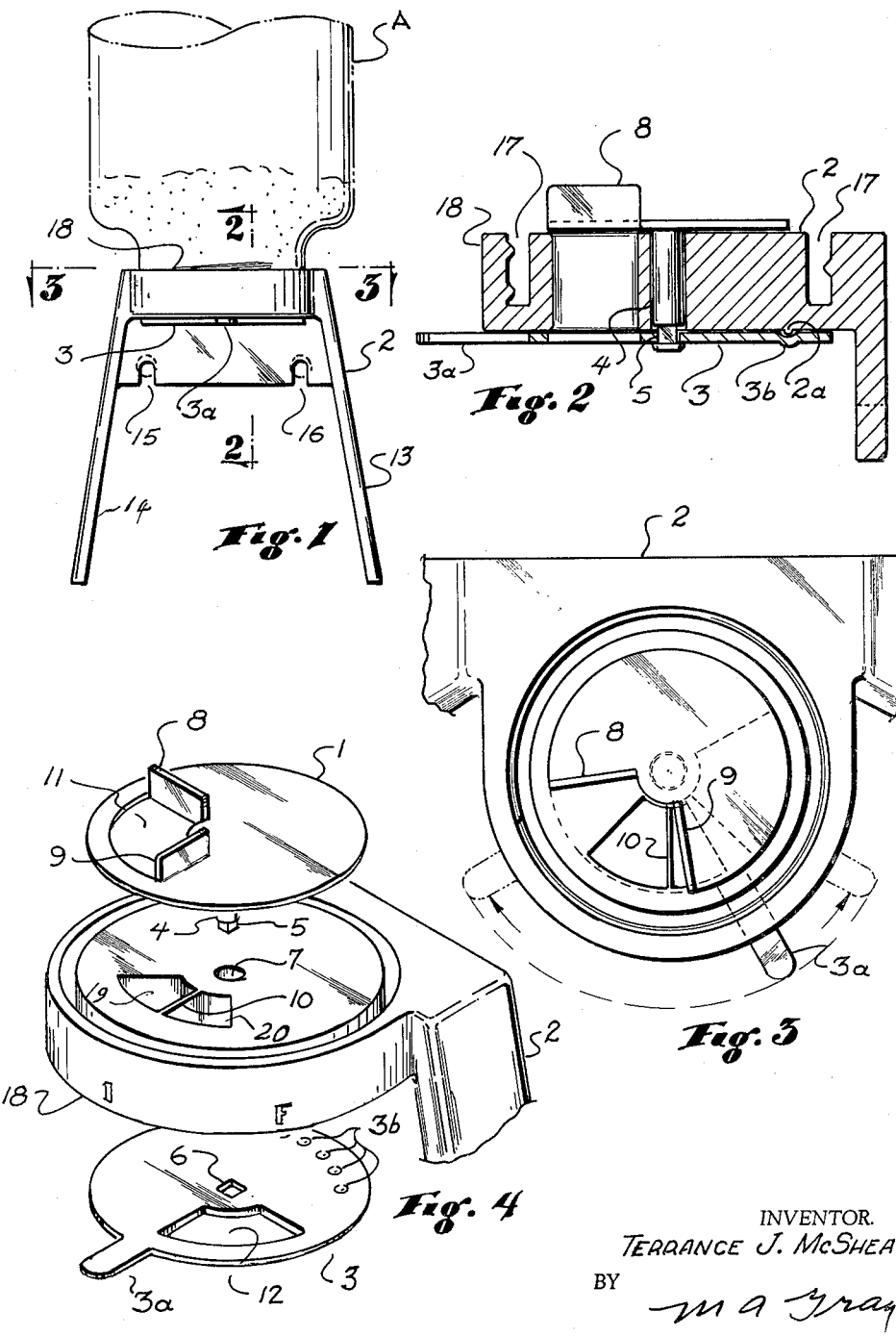
INVENTOR.
TERRANCE J. McSHEA
BY
AGENT

United States Patent Office 3,211,334
Patented Oct. 12, 1965

3,211,334
VARIABLE CHARGE COFFEE DISPENSER
Terrance J. McShea, 5370 Flora St., Montclair, Calif.
Filed Dec. 23, 1963, Ser. No. 332,455
3 Claims. (Cl. 222—39)

This invention relates to a coffee dispenser, and particularly the type that is suitable for table service.

The object of the invention is to provide a device for delivering measured amounts of granular material from a container, being particularly suitable for attachment to a jar of coffee prepared in what is usually referred to as instant coffee.

A further object is to provide a convenient means of attaching the dispenser to the open end of a jar of instant coffee, so that a cup may be placed under the said dispenser and by a manually operated lever, dispense a measured amount of the instant coffee in a cup.

A further object of this invention is the provision of a means for wall attachment whereby the dispenser may be used when secured to a wall, or easily removed therefrom and used for table service.

A still further object of the invention resides in the three-part construction whereby the device is greatly simplified and economical means of manufacture is provided.

Other objects, advantages and features of the invention may hereinafter appear.

Referring to the accompanying drawing which illustrates what is at present deemed to be a preferred embodiment of the invention.

FIG. 1 is a front elevational view of the dispenser, with a portion of a jar attached to the top thereof in a position of use, the fragmentary portion of a jar being shown by means of broken lines.

FIG. 2 is an enlarged fragmentary sectional view taken on line 3—3 of FIG. 1.

FIG. 3 is an enlarged top plan view of the dispenser shown in FIG. 1, a portion of the supporting members being broken away for convenience of illustration.

FIG. 4 is an exploded front perspective view of the upper portion of the dispenser, especially illustrating the three-part construction thereof.

Referring in detail to the drawing, the body portion of the device is designated by the numeral 2, the upper element of the measuring unit being designated by the numeral 1, and the manually controlled outlet member is designated by the numeral 3.

It will be seen by reference to FIGS. 1 and 2 that the container A, in inverted position, is screwed into the recessed portion 17 in the upper portion of the body 2. The outer wall 18 of the recessed portion 17 projects forwardly and provides easy access for placing a cup thereunder.

With reference to the assembly of the parts of the device, by reference to FIG. 4 it will be seen that the portion 18 of the body member is provided with a vertically disposed circular opening 7, into which pin 4 of rotatable member 1 may be inserted and the angular formed end 5 of pin 4 is then seated in angular opening 6 in the bottom member 3 of the manual control unit.

Referring again to the member 1 of the manual control unit it will be noted that an arcuate opening 11 flanked at the outer edges thereof by upwardly turned and vertically disposed wing members 8 and 9 provides a means of moving a quantity of the granular material with which it is in contact in the inverted jar A.

Movement of the lever 3–a of element 3 places the opening 11 in register with openings 19 or 20, or both. The granular material therefore drops through the aforesaid openings 19 and 20 and is held in readiness for the final movement in the dispensing operation.

The upper surface of member 3 closes the bottom of recessed formations 19 and 20. When it is desired to drop the granular material which is being retained in 19 and 20, a further movement of lever 3–a brings the arcuate opening 12 under the lower part of 19 and 20 and drops a measured amount of granular material into a cup under the outwardly projecting portion 18 of body member 2. It will be noted that there is a controlled, or "click-stop" action provided for the operation of the member 3, wherein the protuberances 2–a (see FIG. 2) engage recessed formations 3–b on the upper surface of member 3.

Referring again to FIG. 1 it will be noted that reentrant formations 15, 16 are provided for wall mounting installation. Support members 13, 14 are so formed as to adapt the device to be placed on a table, or other horizontal surface when required. In the outwardly extending portion 18 of the body 2, the openings 19, 20 are divided by a webbed formation 10.

It is obvious that this webbed formation can be adapted to accommodate any variation in the amount to be dispensed by the movement of lever 3–a.

Thus it will be seen that the present invention provides a convenient and economical means of dispensing instant coffee for either table service or from a wall installation.

The construction of the device of the present invention, being composed of three parts, may be economically manufactured, and in operation is simple and practical.

It is to be understood that the form of my invention herewith shown and described is to be taken as a preferred example of the same and that various changes relative to the material, size, shape and arrangements may be resorted to without departing from the spirit of the invention or the scope of the following claims.

I claim:

1. A coffee dispenser for use with an open mouth container, comprising a generally circular horizontally disposed member, adapted to engage the mouth of the said container, said horizontally disposed member having a pair of spaced, downwardly extending supports, and a vertically disposed circular opening in the top central portion thereof, a circular disc seated above the said horizontally disposed member, a vertically disposed shaft secured to the underneath portion of said disc and adapted to extend through the circular opening to engage a horizontally disposed disc beneath the said horizontally disposed member, openings provided in the said discs, and in said horizontally disposed member, so arranged as to dispense measured amounts of granular material upon rotation of the lower disc by means of a handle extending outwardly from the periphery of the said lower disc, a series of uniformly spaced protuberances disposed on the underneath side of the said horizontally disposed member in arcuate formation, a series of uniformly spaced indentations on the upper side of the said horizontally disposed disc beneath the said horizontally disposed member, said indentations having a mating action with the said protuberances, whereby a "click-stop" control of the movement thereof is produced.

2. A three-part coffee dispenser for use with an open mouth container, comprising a generally circular horizontally disposed member adapted to engage the mouth of the said container, said horizontally disposed member having a pair of spaced, downwardly extending supports, and a vertically disposed circular opening in the top center portion thereof, a circular disc seated above the said horizontally disposed member, a vertically disposed shaft secured to the underneath portion of said disc and adapted to extend through the said circular opening to engage a horizontally disposed disc beneath the said horizontally disposed member, openings provided in the said discs, and in said horizontally disposed member, so arranged as to dispense measured amounts of granular material upon rotation of the lower disc by means of a handle extending outwardly from the periphery of the said lower disc, a series of uniformly spaced protuberances disposed on the underneath side of the said horizontally disposed member in arcuate formation, a series of uniformly spaced indentations on the upper side of the said horizontally disposed disc beneath the said horizontally disposed member, said indentations having a mating action with the said protuberances, whereby a "click-stop" control of the movement thereof is produced.

3. A three-part coffee dispenser for use with an open container, comprising a generally circular horizontally disposed member adapted to engage the mouth of the said container, said horizontally disposed member having a pair of spaced, integrally formed, downwardly extending supports, said supports being joined at the upper rear portion thereof by an integrally formed web having a pair of reentrant formations in the lower edge thereof, and a vertically disposed circular opening in the top center portion thereof, a circular disc seated above the said horizontally disposed member, a vertically disposed shaft secured to the underneath portion of said disc and adapted to extend through the said circular opening to engage a horizontally disposed disc beneath the said horizontally disposed member, openings provided in the said discs, and in said horizontally disposed member so arranged as to dispense measured amounts of granular material upon rotation of the lower disc by means of a handle extending outwardly from the periphery of the said lower disc, a series of uniformly spaced protuberances disposed on the underneath side of the said horizontally disposed member in arcuate formation, a series of uniformly spaced indentations on the upper side of the said horizontally disposed disc beneath the said horizontally disposed member, said indentations having a mating action with the said protuberances, whereby a "click-stop" control of the movement thereof is produced.

References Cited by the Examiner

UNITED STATES PATENTS

| | | | |
|---|---|---|---|
| 599,688 | 3/98 | Coy | 222—452 X |
| 829,018 | 8/06 | Kiefer | 222—42 |
| 1,513,460 | 10/24 | Johnson | 222—362 X |
| 1,617,922 | 2/27 | Morrison | 222—452 |
| 1,890,700 | 12/32 | Smith | 222—185 |
| 2,002,039 | 5/35 | McPhee | 222—44 X |
| 2,041,024 | 5/36 | Rueger | 222—498 |
| 2,339,781 | 1/44 | Hurwitz | 222—39 |
| 2,805,799 | 9/57 | Hileman | 222—362 |
| 2,815,154 | 12/57 | Smith | 222—452 |
| 2,877,937 | 3/59 | Weir | 222—452 |
| 3,179,303 | 4/65 | Dankoff et al. | 222—452 X |

M. HENSON WOOD, JR., *Primary Examiner.*

LOUIS J. DEMBO, *Examiner.*